(12) United States Patent
Weichholdt et al.

(10) Patent No.: US 7,074,126 B2
(45) Date of Patent: Jul. 11, 2006

(54) DISCHARGE DEVICE FOR A HARVESTING MACHINE

(75) Inventors: Dirk Weichholdt, Sarreguemines (FR); Klaus Braunhardt, Zweibrucken (DE); Fritz Lauer, Kraehenberg (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/801,225

(22) Filed: Mar. 16, 2004

(65) Prior Publication Data
US 2004/0204210 A1    Oct. 14, 2004

(30) Foreign Application Priority Data
Mar. 28, 2003 (DE) ................ 103 14 081

(51) Int. Cl.
*A01F 12/40* (2006.01)
(52) U.S. Cl. ............................................ 460/112
(58) Field of Classification Search ............... 460/112, 460/111, 79, 78, 119, 901
See application file for complete search history.

(56) References Cited

U.S. PATENT DOCUMENTS

| 3,103,241 | A | * | 9/1963 | Weigel ........................ 241/55 |
| 3,521,687 | A | * | 7/1970 | Gaeddert ...................... 241/80 |
| 3,669,122 | A | * | 6/1972 | Rowland-Hill ................ 460/73 |
| 3,669,123 | A | * | 6/1972 | Gaeddert et al. ............ 460/112 |
| 3,794,047 | A | * | 2/1974 | De Coene et al. ............ 460/66 |
| 5,232,405 | A |   | 8/1993 | Redekop et al. |
| 5,556,042 | A | * | 9/1996 | Roberg .................. 241/101.76 |
| 6,126,098 | A | * | 10/2000 | Schrattenecker ............. 241/47 |
| 6,251,009 | B1 | * | 6/2001 | Grywacheski et al. ....... 460/112 |
| 6,554,701 | B1 | * | 4/2003 | Wolters ....................... 460/101 |
| 6,598,812 | B1 | * | 7/2003 | Matousek et al. ........... 239/682 |

FOREIGN PATENT DOCUMENTS

| DE | 3620747 A1 | 6/1986 |
| DE | 3620747 C2 | 6/1986 |
| DE | 4006513 A1 * | 9/1991 |
| DE | 44 31 802 A1 | 9/1994 |
| EP | 0631717 A1 * | 5/1994 |
| EP | 0 958 727 B1 | 4/1999 |

* cited by examiner

*Primary Examiner*—Árpád Fábián Kovács

(57) ABSTRACT

A crop discharge device for discharging crop from a harvesting machine, comprising a rotatatable rotor mounted in a housing having a movable a bottom. The bottom can be put into a reciprocating motion in order to convey the crop to be discharged to the crop discharge device. Chaff from a cleaning shoe is directed by an oscillating bottom to the bottom. The discharge device may comprise a straw chopper which discharges chaff and straw from the harvesting machine in the chopping mode.

15 Claims, 2 Drawing Sheets

DISCHARGE DEVICE FOR A HARVESTING MACHINE

FIELD OF THE INVENTION

The present invention is directed to a discharge device for discharging crops from a harvesting machine. The discharging device comprises a rotatable rotor mounted in a housing having a moving bottom.

BACKGROUND OF THE INVENTION

In many combines, the chaff is discharged through separate chaff distributors. The chaff distributors are relatively large blowers, which are usually driven hydraulically. Therefore, they are relatively costly and heavy. Thus, it can be advantageous to discharge the chaff through an existing straw chopper.

In DE 44 31 802 A it is proposed to feed the chaff through a back and forth moving inlet bottom of a horizontal conveyor screw, which feeds the chaff together with the straw to one or two straw choppers with vertical rotational axes.

In the publications DE 102 56 744 A and DE 103 03 503 A published later, it is proposed to convey the chaff by means of an oscillating base from the cleaning section to the inlet of the straw chopper, in DE 103 03 503 A with the simultaneous action of a rotating conveyor.

In U.S. Pat. No. 3,669,123 A, a combine is described, for which the chaff is fed by a slide connected to the cleaning shoe to the bottom of a straw chopper housing. The cleaning shoe shakes the slide. The straw chopper is located above the inlet for the chaff. The chaff is discharged by the air stream generated by the straw chopper.

According to U.S. Pat. No. 5,232,405 A, a conveyor belt is used for transporting the chaff from the cleaning section into a straw chopper.

In EP 0 958 727 A, it is proposed to transport the chaff released by the cleaning section through a cross auger initially outwards transverse to the direction of travel. Two partial streams are produced on both sides of the combine, which are transported backwards through additional augers and fed in the axial direction to a straw chopper with a horizontal rotational axis that is transverse to the direction of travel.

The above mentioned references disclose a mechanical feed of the chaff into the straw chopper. The chaff is introduced into the straw stream at the end of the conveyor by the force of gravity (DE 44 31 802 A, U.S. Pat. No. 5,232,405 A, DE 102 56 744 A), by a rotating conveyor (DE 103 03 503 A, EP 0 958 727 A), or by the suction effect of the straw chopper (U.S. Pat. No. 3,669,123 A). Here, transfer problems can occur.

In DE 36 20 747 A, a combine with a straw chopper is described. The straw released by the straw shakers slides along a straw guiding plate into the straw chopper. The straw guiding plate is set into a vibrating motion in order to improve conveyance. Here, likewise only one element is set in vibration, which transports the crop residue into the straw chopper, so that conveyance problems can occur with the transfer into the straw chopper.

SUMMARY OF THE INVENTION

It is an object of the present invention to provide an improved discharge device for a harvesting machine, for which the disadvantages mentioned above occur not at all or only to a limited degree.

It is proposed to set the bottom of the housing of the discharge device in a vibrating motion. Through this oscillating or vibrating motion, which is preferably oriented tangential to the rotational direction of the rotor of the discharge device (or its circular envelope) and thus corresponds to the supply direction of the discharged goods, the goods are successively fed to the rotor and grasped by it. Because not only the supply device, but also the housing bottom moves, there is no risk of transfer problems at the inlet of the discharge device.

The feed of the discharged goods can be improved by a step like shoulder in the bottom, wherein the shoulder moves like a piston and feeds the goods successively to the rotor.

The invention is particularly suitable for combines, for which a straw chopper is usually used as a discharge device. However, it is also conceivable to set the bottom of a blower or some other conveyor used for discharge of crops into oscillations in the way according to the invention. For such embodiments, a straw chopper of arbitrary configuration can be arranged in front of or behind the discharge device, e.g., a number of chopping blades interacting with a separating rotor, a conventional straw chopper with a rotor and oscillating blades which interact with counter blades, or rotating arms whose ends are provided with blades.

Especially advantageous is the use of the invention in combines, for which a first crop residue stream (straw) is fed to the discharge device from a separating device and a second crop residue stream (chaff) from a cleaning device. The second crop residue stream is fed to the housing bottom, while the first crop residue stream is usually fed in a known way to the rotor from above.

For transporting the second crop residue stream, an arbitrary conveyor can be provided, e.g., a belt or bowl conveyor. However, an oscillating bottom conveyor, which is set into an oscillating motion, like the housing bottom, has proven to be especially advantageous. This oscillating motion can be taken from the existing oscillating motion of the cleaning device.

The bottom of the discharge device can be connected rigidly to the oscillating bottom. However, because the housing bottom should move as little as possible in the vertical (or radial to the rotor) direction in order to maintain a constant distance between the housing bottom and the rotor for the purpose of optimum conveyance of goods, a relatively small vertical motion, which can lead to a non optimal conveyance, is also produced in the region of the oscillating bottom in the vicinity of the housing bottom. Therefore, it is preferred to connect the housing bottom to the oscillating bottom through a joint or a hinge. Therefore, the latter can move sufficiently in the vertical direction, which improves its conveyance ability.

The present invention can be used especially meaningfully on a combine, for which the first crop residue stream (i.e., the straw) is fed to the straw chopper in a chopping mode and led past the straw chopper, usually to the back side of the straw chopper, in a long stalk straw deposition mode. The second crop residue stream is fed to the straw chopper in the chopping mode and distributed together with the first crop residue stream approximately over the width of the cutting apparatus over the field. In the long stalk straw deposition mode, the second crop residue stream is likewise fed to the straw chopper in order to provide it with sufficient velocity to leave the combine without any problems. The second crop residue stream can be deposited in a swath in the long stalk straw deposition mode. It is introduced into the straw swath or laid underneath. Therefore, the chaff can be taken up and used together with the straw. In another (especially selectively feasible) mode, the second crop residue stream is distributed over the field after passage through the straw chopper in the long stalk straw deposition mode, wherein chaff is optionally not included in the area of the straw swath.

DETAILED DESCRIPTION

Figure 1:
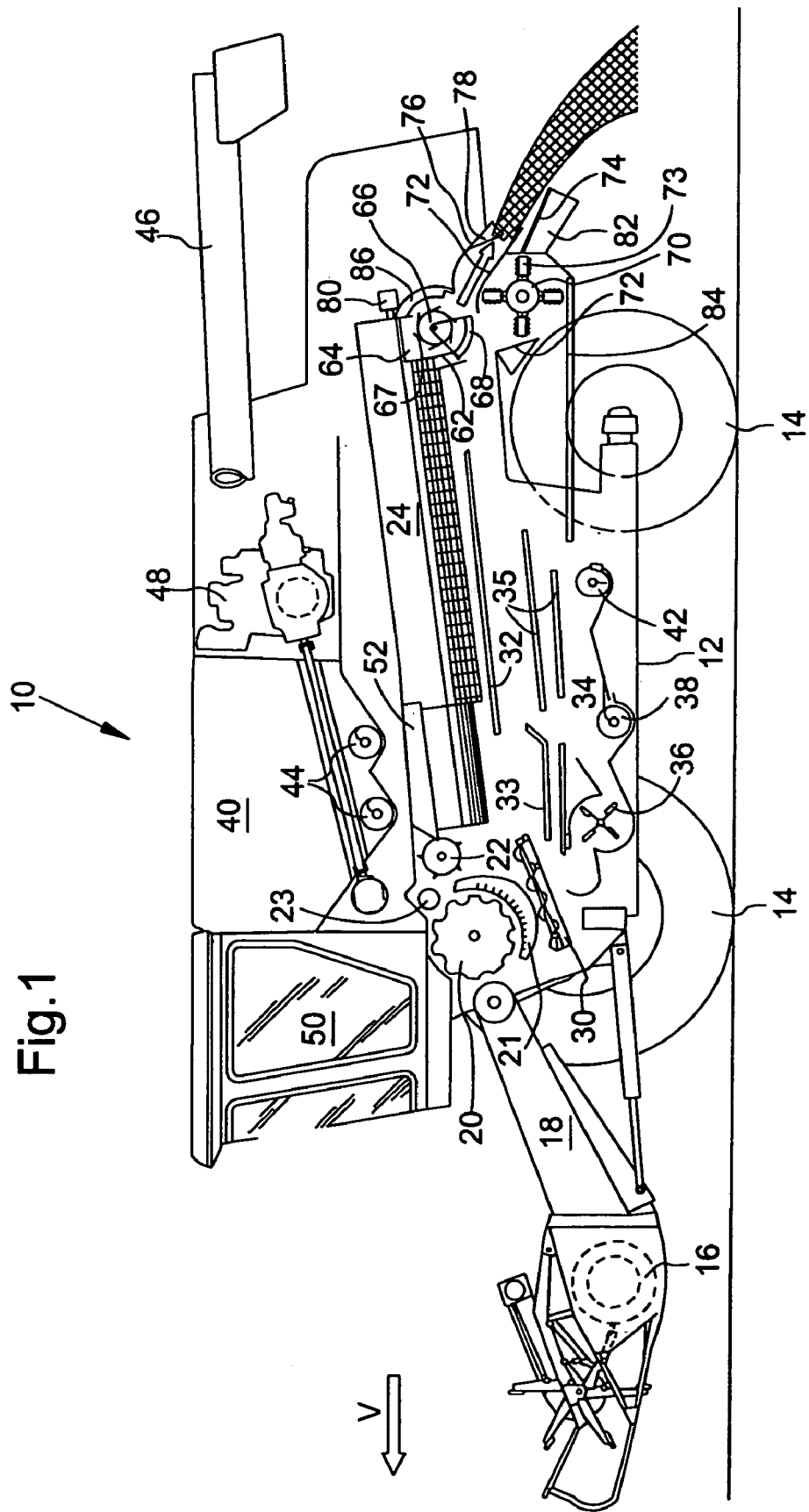
FIG. 1 is a schematic side view of a combine with an axial separator and a straw chopper, which is used for discharging the chaff.

FIG. 1 shows a self propelled combine 10 with a chassis 12. The chassis 12 is supported by front driving wheels and rear steering wheels 14. The wheels 14 are driven by means of a drive means, not shown, in order to move the combine 10 over a field to be harvested. The front of the combine 10 is provided with a harvesting assembly in the form of a cutting platform 16 to harvest the crop from the field and to feed it upwards and backwards through a feeder house 18 to threshing and separating assemblies. The threshing and separating assemblies include a transverse threshing cylinder 20 and associated concave 21 to which the harvested crop is first fed. However, it is also conceivable to leave out the transverse threshing cylinder 20 and to use an axial threshing assembly that is integral with an axial separator. Downstream from the threshing cylinder 20 and concave 21 is an axial separator 24. The axial separator can be arranged as a single axial separator or two (or more) axial separators arranged one next to the other. Also, the use of straw walkers or separating drums arranged downstream of the threshing drum as separating assembly is also conceivable. Together with a supply housing, a stripping roller 23 and a feed beater 22 direct the threshed crops from the threshing cylinder 20 and concave 21 to the axial separator 24. The axial separator 24 is driven on its rear side by a gear 80. All indications of direction, such as front, behind, above, and beneath, refer to the direction of forward travel V of the combine 10.

Grain and chaff, which are separated during the threshing process, fall onto at least one screw conveyor 30, which feeds both to a preparation pan 33. In contrast, grain and chaff, which are discharged from the axial separator 24, fall onto a grain pan 32, which leads the grain and chaff to the preparation pan 33. The preparation pan 33 leads the grain and chaff to a cleaning shoe 34 having sieves 35. A blower 36 directs an air blast upwardly through the sieves 35 in order to separate the chaff from the grain. Cleaned grain is fed by means of a clean grain auger 38 to an elevator, not shown, which lifts the cleaned grain into a grain tank 40. A tailings auger 42 sends non threshed crop portions through another elevator, not shown, back into the threshing process. The chaff is discharged on the rear side of the cleaning shoe 34 onto an oscillating floor 84, which is described in more detail below. The cleaned grain can be unloaded from the grain tank 40 by an unloading system comprising cross augers 44 and an unloading auger 46.

The mentioned systems are driven by means of an internal combustion engine 48, which is controlled by an operator from a cab 50. The different devices for threshing, transporting, cleaning, and separating are located within the chassis 12.

From the axial separator 24, which is used as a separating device (or one of the other alternative separating devices mentioned above), a first crop residue stream, which essentially consists of threshed crop residue (straw), is discharged downwards through an outlet 64 at the bottom rear end of the axial separator 24, which is closed at the back. Through the effects of centrifugal force and the force of gravity, the crop residue falls into a vertical discharge shaft, which is limited at the front by a front wall 62. Beneath the outlet 64 there is a discharge drum 66, around whose circumference carriers 67 are distributed. Towards the rear, the discharge drum 66 is enclosed by a rear wall 86. The discharge drum 66 is set in rotation about its longitudinal axis by a drive in a clockwise direction in FIG. 1. The discharge drum 66 extends perpendicular to the direction of travel. A straw guiding element 68, which can pivot about the rotational axis of the discharge drum 66, contacts the front wall 62, approximately beneath the rotational axis of the discharge drum 66. The straw guiding element 68 can pivot about the rotational axis of the discharge drum 66 between the long stalk straw deposition position shown in FIG. 1 and a chopping position not shown in the figures.

Beneath and slightly behind the discharge drum 66 is a straw chopper 70 housed in housing 72. The straw chopper 70 acts as a discharge device which is set in rotation about a horizontal axis running perpendicular to the direction of travel (in the counterclockwise direction in the figures) by a drive. It includes a cylindrical rotor with chopping blades 73, which are mounted so that they can pivot on the rotor and which interact with stationary counter blades 75 arranged in the housing 72 to chop the crop residue. The chopped crop residue is distributed by a straw distributor chute 74 arranged downstream from the straw chopper 70. The straw distributor chute 74 is equipped with straw guiding plates 82. The straw guiding plates 82 attempt to distribute the crop residue over the cutting width of the combine 10 onto the field. The rotor can also be provided with elements for air agitation. A top part of the housing 72 extends above the rotational axis of the straw chopper 70 from the front end of the straw distributor chute 74 like a circular arc approximately up to a point above the rotational axis of the straw chopper 70. A front part of the housing 72 runs downwards between the contact point of the straw guiding element 68 to the front wall 62 and the front side of the straw chopper 70 approximately vertical.

The straw guiding element 68 is concave like a circular arc and encloses the discharge drum 66 by an angle of approximately 45° concentrically. It is hinged on its outer end in the transverse direction so that it can pivot on the chassis 12 of the combine 10. The straw guiding element 68 extends from the front wall 62 to approximately over the rotational axis of the straw chopper 70 in the long stalk straw deposition position reproduced in FIG. 1. In this position, the straw guiding element 68 acts so that the threshed crop residue, i.e., the first crop stream, is delivered by the discharge drum 66 beyond a discharge chute 76 diagonally backwards and downwards. The discharge chute 76 is provided on its bottom side with straw guiding plates 78 in order to define the width of the swath, in which the crop residue is laid.

Figure 2:
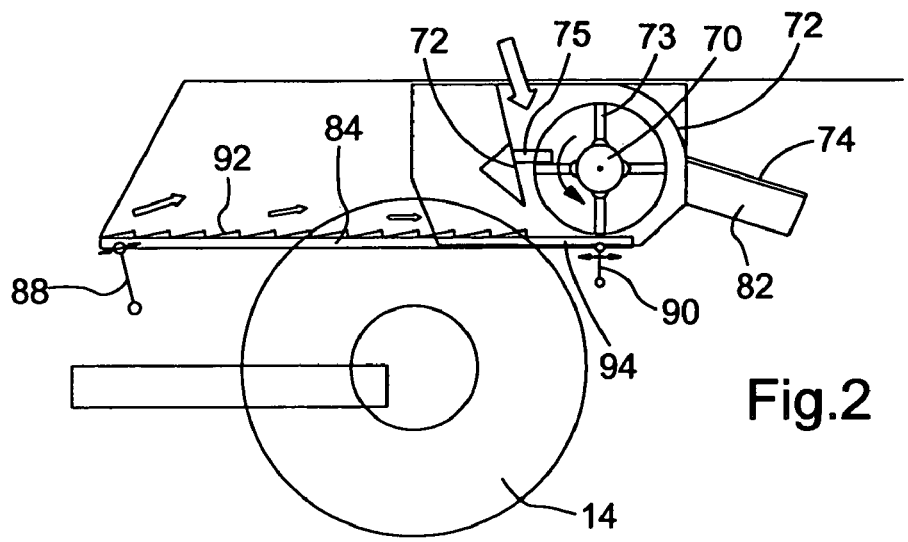
FIG. 2 is an enlarged side view of the conveyor device, which transports the chaff into the straw chopper in the combine from FIG. 1.
Figure 3:
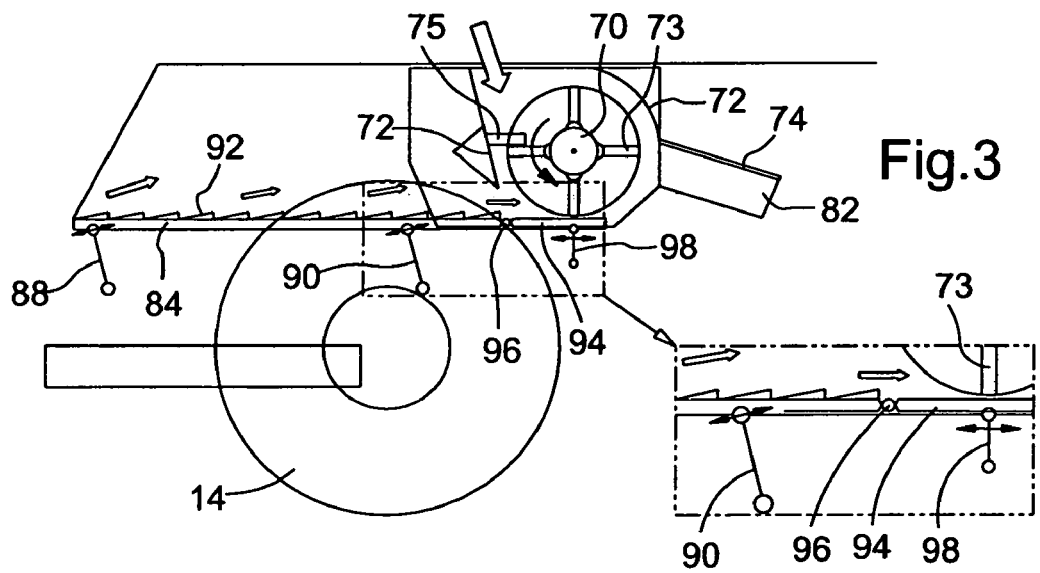
FIG. 3 is a side view of another embodiment of the conveyor device from FIG. 2.
Figure 4:
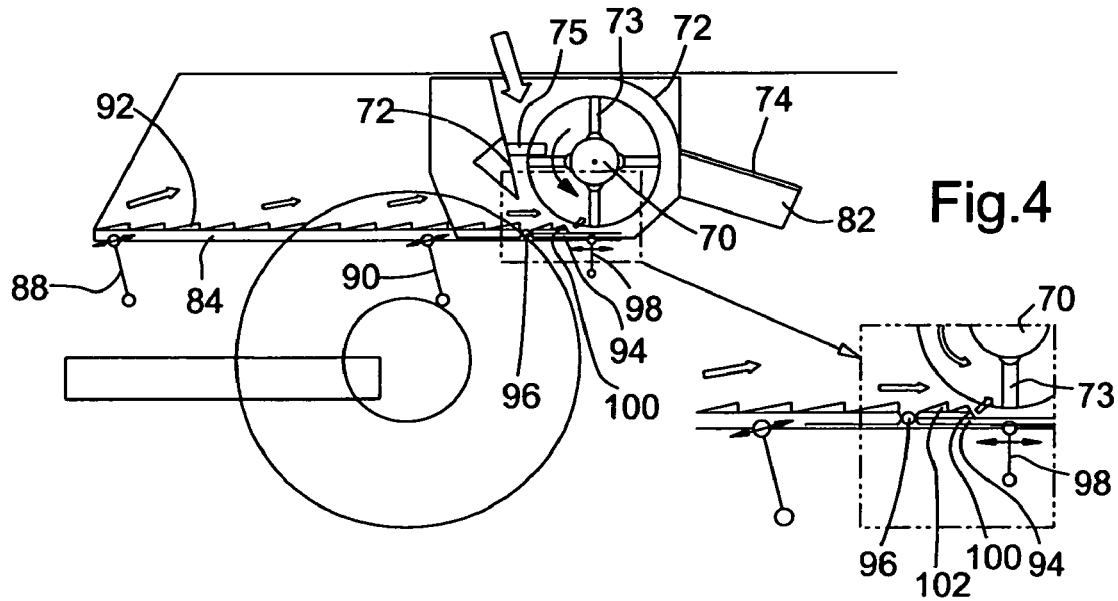
FIG. 4 is a side view of another embodiment of the conveyor device from FIG. 2.

The straw chopper 70 is set in rotation in the position of the guiding plate 68, as shown in FIG. 1. It exerts a conveyance effect on the chaff and the short straw portion fed to it through the oscillating bottom 84, which is therefore sufficient to convey the latter along the straw guiding plate 82 and to push it onto the field behind the combine 10. As indicated in FIGS. 2–4, the first crop stream leads into the straw chopper 70, when the straw guiding element 68 is pivoted backwards.

The straw guiding plates 82 of the straw distributor chute 74 are hinged to the straw distributor chute 74 so that they can pivot about axes extending perpendicular to their longitudinal axes and the direction of flow of the goods. In this way, the straw guiding plates 82 can move between a broad deposition position and a swath deposition position.

In the chopping position, the straw guiding element 68 pivots backwards about the rotational axis of the discharge drum 66 (in the counterclockwise direction with reference to FIG. 1). Therefore, an opening is unblocked between the front wall 62 and the front edge of the straw guiding element 68, through which the first crop residue stream is led into the straw chopper 70. In the straw chopper 70, the straw is chopped and discharged together with the chaff diagonally backwards and downwards and distributed over the working width of the cutting apparatus 16 over the field.

The oscillating bottom 84 extends from the rear, lower end of the cleaning shoe 34 diagonally backwards and slightly downwards up to beneath the straw chopper 70. There, it joins a bottom 94 of the housing 72 of the straw chopper 70. The oscillating bottom 84 is coupled mechanically to the cleaning shoe 34. The latter is set into a shaking motion with horizontal and vertical components through suitable drives, e.g., cams, similar to the grain pan 32, in a known way. The oscillating bottom 84 driven by the cleaning shoe 34 and moving with this device thus forms a bottom 94 of the housing 72 of the straw chopper 70, which bottom oscillates in the vertical and horizontal direction, wherein the bottom 94 can be produced as one part with the oscillating bottom 84 or as a separate element.

The arrangement and support of the oscillating bottom 84 are shown in more detail in FIG. 2. Near its front end, it is supported on the frame 12 of the combine 10 by an oscillating rocker 88 inclined slightly forward, but essentially vertical. Underneath the straw chopper 70, it is attached to the frame of the combine 10 by a second oscillating rocker 90. The oscillating rockers 90 are each supported on the frame 12 and the oscillating bottom 84 so that they can pivot on axes running horizontal and perpendicular to the direction of forward travel.

Because the oscillating bottom 84 is provided on its top side with saw tooth like steps 92 or another suitable surface structure and completes an oscillating motion, the chaff and other short stalk straw portions, which are discharged as the second crop residue stream from the cleaning shoe 34 to its rear end through the effect of the blower 36 and through the force of gravity on the oscillating bottom 84, travel backwards on the oscillating bottom 84.

The steps 92 end shortly before the straw chopper 70. The bottom 94 of the housing 72 of the straw chopper 70 may be rigidly connected to the oscillating bottom 84 and moving back and forth with this bottom creates a successive feeding of the second crop residue stream to the straw chopper. Because the bottom 94 should move as little as possible in the vertical direction, and because otherwise the distance between the circular envelope of the chopping blades 73 and the bottom 94 would change, the second oscillating rocker 90 is arranged as vertical as possible.

In FIG. 3, a second embodiment of the invention is shown. It comprises the oscillating bottom 84, which is provided with saw tooth like steps 92 and is supported on a first oscillating rocker 88 and a second oscillating rocker 90, and ends before the straw chopper 70. The bottom 94 of the housing 72 of the straw chopper 70 is configured as a separate element and is connected by a joint 96 in the form of a hinge with a pivoting axis oriented horizontal and perpendicular to the direction of forward travel to the oscillating bottom 84. In the vicinity of its rear end, the bottom is connected by a third oscillating rocker 98 to the frame 12. The vertical arrangement of the third oscillating rocker 98 and the joint 96 enable a nearly exclusively horizontal motion of the bottom 94 and a constant distance to the circular envelope of the straw chopper 70. One advantage of this embodiment is that the second oscillating rocker 90 does not have to be arranged exactly vertical, so that the oscillating bottom 84 can also exhibit a vertical motion component over its entire length, which improves its conveyance effect.

The embodiment illustrated in FIG. 4 differs from the previously illustrated embodiments essentially in that the top side of the bottom 94 is not smooth. It is provided in the front, upstream region with smaller steps 102, which correspond to the steps 92 of the shaking bottom 84. Directly in front of the contact point with the circular envelope of the chopping blades 73, on the bottom 94 there is a larger shoulder 100, which is inclined backwards, has a bevel facing the straw chopper 20 [sic; 70], whose shape is approximately adapted to this circular envelope. While the steps 102 simplify the transport of the second crop residue stream, the step 100 acts like a piston, which presses the material successively into the active region of the straw chopper 70. Therefore, one achieves an active and improved conveyance of the crop stream into the straw chopper 70.

Having described the illustrated embodiments, it will become apparent that various modifications can be made without departing from the scope of the invention as defined in the accompanying claims.

The invention claimed is:

1. A discharge device for discharging crop residue stream from a harvesting machine, comprising a rotatable chopper mounted in a housing with a bottom, wherein the housing bottom is connected to the harvesting machine by means of an oscillating rocker so that the housing bottom can oscillate in a direction of motion back-and-forth for feeding residual crop material through the chopper, wherein said housing bottom extends rearward to extend beyond a point of lowermost extent of the rotatable chopper.

2. The discharge device as defined by claim 1 wherein the rotatable chopper has a circumference and the direction of motion of the housing bottom is tangential to the circumference of the chopper.

3. The discharge device as defined by claim 2 wherein the housing bottom is provided with a step-shaped shoulder at a front end thereof for improved pushing of residual crop material through the chopper.

4. The discharge device of claim 1 wherein the oscillating housing bottom is connected to an oscillating floor bottom of a cleaning assembly by means of a pivotable joint, the oscillating housing bottom accepting residual crop material from the oscillating floor bottom of the cleaning assembly.

5. The discharge device of claim 1 wherein the oscillating housing bottom is rigidly connected to an oscillating floor bottom of a cleaning assembly, the oscillating housing bottom accepting residual crop material from the oscillating floor bottom of the cleaning assembly.

6. A combine comprising
   a supporting structure;
   a threshing assembly for threshing harvested crop material is mounted to the supporting structure;
   a separating assembly for separating threshed crop material is mounted to the supporting structure;
   a cleaning assembly including a cleaning shoe for removing chaff from grain and an oscillating floor bottom for moving the crop residue toward the discharge device, the oscillating floor bottom connected to the combine supporting structure by at least one oscillating rocker; and a discharge device for discharging chaff from the combine, comprising a rotatable chopper mounted in a housing with a bottom mounted to the supporting structure by means of another oscillating rocker, wherein the housing bottom can be oscillated in a direction of motion back-and-forth for feeding residual crop material through the chopper, and wherein said housing bottom extends rearward to extend beyond a point of lowermost extent of the rotatable chopper.

7. The combine as defined by claim 6 wherein the rotatable chopper has a circumference and the direction of motion of the housing bottom is tangential to the circumference of the chopper.

8. The combine as defined by claim 6 wherein the bottom is provided with a step-shaped shoulder for improved pushing of residual crop material through the chopper.

9. The combine as defined by claim 6 wherein the discharge device includes a blower.

10. The combine as defined by claim 6 wherein the chopper of the discharge device is a straw chopper that receives separated crop material from the separating assembly.

11. The combine as defined by claim 6 wherein the oscillating floor bottom and housing bottom are connected mechanically to the cleaning shoe, the oscillating floor bottom and the oscillating housing bottom capable of being set into an oscillating motion by movement of the cleaning shoe.

12. The combine as defined by claim 6 wherein the oscillating floor bottom is connected to the oscillating housing bottom by a pivotable joint.

13. The combine as defined by claim 6 wherein the oscillating floor bottom is rigidly connected to the oscillating housing bottom.

14. The combine as defined by claim 11 wherein the first crop residue stream can be fed to the discharge device in a chopping mode and can be led past the discharge device in a long-stalk straw deposition mode and laid on a field as a swath, and the second crop stream can be fed to the discharge device in the chopping mode and the long-stalk straw deposition mode.

15. The combine of claim 7, wherein the back-and-forth oscillating housing bottom of the housing in which the chopper is mounted extends rearward underneath the chopper to a point beyond a point of closest approach of the housing bottom with respect to the chopper circumference.

* * * * *